United States Patent
Malinasky, Jr.

(10) Patent No.: US 9,890,548 B2
(45) Date of Patent: *Feb. 13, 2018

(54) IN-FLOOR POOL CLEANING SYSTEM

(71) Applicant: Blue Square Manufacturing, LLC, Chandler, AZ (US)

(72) Inventor: Paul Gerald Malinasky, Jr., Scottsdale, AZ (US)

(73) Assignee: Blue Square Manufacturing, LLC, Chandler, AZ (US)

( * ) Notice: Subject to any disclaimer, the term of this patent is extended or adjusted under 35 U.S.C. 154(b) by 83 days.

This patent is subject to a terminal disclaimer.

(21) Appl. No.: 14/810,220

(22) Filed: Jul. 27, 2015

(65) Prior Publication Data
US 2015/0330094 A1   Nov. 19, 2015

Related U.S. Application Data

(63) Continuation of application No. 12/941,993, filed on Nov. 8, 2010, now Pat. No. 9,091,094.

(60) Provisional application No. 61/316,270, filed on Mar. 22, 2010.

(51) Int. Cl.
| | | |
|---|---|---|
| *E04H 4/00* | (2006.01) | |
| *E04H 4/16* | (2006.01) | |
| *F16K 31/12* | (2006.01) | |
| *B05B 3/16* | (2006.01) | |
| *B05B 15/10* | (2006.01) | |
| *F16K 11/074* | (2006.01) | |

(52) U.S. Cl.
CPC ............... *E04H 4/169* (2013.01); *B05B 3/16* (2013.01); *B05B 15/10* (2013.01); *E04H 4/1681* (2013.01); *F16K 11/074* (2013.01); *F16K 31/12* (2013.01); *Y10T 137/7754* (2015.04); *Y10T 137/86509* (2015.04)

(58) Field of Classification Search
CPC ............ E04H 4/169; B05B 3/16; B05B 15/10
USPC ............................................................. 4/490
See application file for complete search history.

(56) References Cited

U.S. PATENT DOCUMENTS

| | | | | |
|---|---|---|---|---|
| 4,077,424 A * | 3/1978 | Ehret | ..................... | F16K 11/074 137/119.07 |
| 4,746,424 A * | 5/1988 | Drew | .................... | E04H 4/1263 134/167 R |
| 4,817,656 A * | 4/1989 | Gould | ................... | F16K 11/166 137/118.06 |
| 6,325,087 B1 * | 12/2001 | Tarr | ...................... | F16K 11/074 137/1 |

(Continued)

*Primary Examiner* — Huyen Le
(74) *Attorney, Agent, or Firm* — Schmeiser, Olsen & Watts LLP

(57) ABSTRACT

A distribution valve of an in-floor pool cleaning system is provided. The distribution valve includes a housing having an inlet port and a plurality of outlet ports. A turbine within the housing rotates about a shaft in response to fluid flowing through the inlet port. The turbine is releasably coupled to a gear mechanism, and the gear mechanism is releasably coupled to a distribution valve disk, the disk having an aperture therein. As the turbine rotates, the gear mechanism also rotates and drives the rotation of the disk around the shaft. The rotation of the disk sequentially places the aperture over one of the plurality of outlet ports, thus allowing fluid to flow out of the outlet port over which the aperture is positioned, but restricting fluid flow into any of the outlet ports that are covered by the disk.

20 Claims, 19 Drawing Sheets

(56) References Cited

U.S. PATENT DOCUMENTS 8,714,182 B2 * 5/2014 Malinasky, Jr. .......... B05B 3/16
  137/119.07
9,222,274 B1 * 12/2015 Goettl ....................... E04H 4/16

* cited by examiner

IN-FLOOR POOL CLEANING SYSTEM

PRIORITY CLAIM

This application is a continuation of U.S. patent application Ser. No. 12/941,993 entitled "Head for In-Floor Pool Cleaning System," filed Nov. 8, 2010, which claims priority to U.S. Provisional Application No. 61/316,270 entitled "In Floor Pool Cleaning System," filed Mar. 22, 2010, the disclosures of which are incorporated herein by reference.

FIELD OF THE INVENTION

This invention relates generally to pool cleaning devices, and more particularly to a fluid distribution valve in an in-floor pool cleaning system.

BACKGROUND OF THE INVENTION

In-floor pool cleaning systems have been developed that clean the inner surfaces of a pool by using pressurized bursts of water from cleaning heads mounted in the floor, sides and/or steps of the pool to move debris (which includes dirt, leaves and other material in the pool) into one or more drains where vacuum pulls the debris into a filtering system. A pump, a distribution valve connected to the pump, and one or more cleaning heads connected to the distribution valve are used in a typical in-floor cleaning system. The pump delivers pressurized water into the distribution valve, which directs the pressurized water to successively control the operation of one or more cleaning heads at a time.

In a conventional distribution valve, fluid, such as water, enter a cavity of the distribution valve (or "valve") through an inlet port and exit through outlet ports. In one such known design, each of the outlet ports is covered by a corresponding outlet valve that is opened or closed in response to the operation of an impeller positioned inside the cavity and connected to a gear reduction mechanism. As the impeller rotates, the gear reduction mechanism rotates to drive a cam system that sequentially opens and closes each individual outlet valve to open and close the corresponding outlet port.

A problem with this design is that a relatively large force must be applied by the gear reduction mechanism to turn the cam that opens and closes each individual outlet valve. Moreover, over time, as mineral deposits build up on the outlet valves and/or the cam surface, the valves become increasingly more difficult to open and close, thus requiring even more force to turn the cam. Further, the torque required from the gear reduction mechanism creates stress in each of the distribution valve components, and specifically in the gears themselves. This stress results in increased wear and tear, which shortens the life span of the components. Increased wear and tear also adds to the operational costs due to more frequent maintenance, repair, and replacement of parts, and leads to down time required to perform such tasks.

Other disadvantages of such conventional distribution valves are their size and the number of moving parts. First, the relatively large size of conventional valves requires more material to manufacture the valve, which leads to an increase in the overall cost. Second, for the known distribution valve previously described, it includes not only the moving parts of the gear reduction mechanism, but a separate outlet valve for each of the outlet ports, and these respective valves that must repeatedly open and close in order for water to move through the corresponding outlet port. The relatively large number of moving parts increases manufacturing costs, leads to more malfunctions, downtime and makes it more difficult to replace damaged components.

Another drawback of the conventional distribution valve described herein is restricted fluid flow and fluid blow-by. When in the open position, the outlet valve still restricts the amount of fluid that flows through the associated outlet port. In addition, when closed, the outlet valve does not sufficiently seal the outlet ports that are not in use. Thus, the closed valves still permit some fluid to pass into the corresponding outlet ports, thus reducing the pressure of fluid exiting the open outlet port and decreasing the efficiency of the pool cleaning system. An increase in pump horsepower, and the power consumption of the pump, is required to maintain operational requirements. Conventional distribution valves thus often require larger pumps that demand more power than might otherwise be necessary if they operated more efficiently. Consequently, there is a need for an improved distribution valve.

Cleaning heads are known and they typically consist of an outer sleeve and an insert that fits within the sleeve. Cleaning heads are mounted in the floor, side or steps of a pool and are preferably flush with the pool surface. When pressurized water is diverted by the valve to a particular cleaning head (or group of cleaning heads), the pressurized water enters the insert and pushes the insert partially out of the sleeve so that the opening in the insert extends beyond the sleeve. The insert has an aperture through which pressurized water flows in order to push debris towards a drain. Sometimes the inserts remain stuck in the out position, where people can step on them and hurt themselves and/or break the insert.

There is a need for a distribution valve that operates under less stress, restricts less of the fluid flow from the pump to the cleaning heads, requires less power to operate effectively, and does so with fewer moving parts.

SUMMARY OF THE INVENTION

A cleaning head for an in-floor pool cleaning system is disclosed. The head comprises these basic components: (1) a sleeve with a top opening and a bottom opening, (2) an insert positioned within the sleeve, and (3) a biasing element. The sleeve is preferably a generally cylindrical, plastic component with a bottom end for mounting into the floor of a pool and a top end that is preferably flush with the pool surface when the cleaning head is installed. The sleeve has an opening in the bottom (the "bottom opening") and a smaller opening in the top (the "top opening"). The sleeve fits into a collar, which is a preferably a generally cylindrical housing that is placed in the floor side, or step of a pool as the pool is being constructed. The collar includes a water stop, which is preferably a circular flange, on its upper edge. In a preferred embodiment the water stop has a plurality of grooves to better adhere to material (usually a type of concrete) used to form or secure the surface of the pool and prevent leakage from around the water stop.

The insert preferably has a first body portion that is juxtaposed the second opening and a second body portion juxtaposed the first opening, the second body portion being wider than the first body portion. The first body portion is configured to fit through the top opening of the sleeve, while the second body portion is configured to not fit through the top opening of the sleeve. The insert also has an aperture in the first body portion and a passage running through the second body portion and the first body portion to the aperture. The insert has a first position wherein it is retained within the sleeve and a second position wherein the aperture of the first body portion extends beyond the top opening.

The biasing element is preferably a conical spring surrounding at least part of the first body portion of the insert and preferably rests (or is positioned) on an upper ledge of the second body portion. The biasing element biases the insert towards the first position wherein it is retained within the sleeve, and could be any structure suitable for this purpose.

The cleaning head is moved from its first position to its second position by pressurized water being applied to the second body portion at the bottom of the sleeve. As the pressurized water enters the passage of the body portion, the pressure overcomes the pressure exerted by the biasing element and the insert moves from the first position to the second position wherein the aperture in the first body portion extends beyond the opening in the top of the sleeve. Pressurized water exits the aperture to move debris in the pool towards a location (such as a drain) where it can be collected by a filtering device. When the distribution valve discontinues directing pressurized water to the head, the pressure from the biasing element assists in moving the insert from the second position back to the first position.

The cleaning head also has an indexing component that indexes the insert as it moves from one or both of the second position to the first position or the first position to the second position. In a preferred embodiment, the indexing component comprises teeth, or grooves formed in the insert (preferably in the first body portion), and one or more pins in the wall of the sleeve. The teeth engage the one or more pins as the insert moves from the first position to the second position and back, which causes the insert to index so that pressurized water is applied to different portions of the pool floor as the insert indexes to different positions.

The present invention provides for a distribution valve in an in-floor pool cleaning system, the distribution valve including a housing having an inlet port and a plurality of outlet ports. The distribution valve further includes a cover that releasably couples to the housing, wherein a fastener releasably couples the cover to the housing. The distribution valve further includes a turbine within the housing that rotates in response to fluid flowing through the inlet port. The turbine is releasably coupled to a gear mechanism within the housing, and the gear mechanism is releasably coupled to a distribution valve disk also within the housing. The turbine and the distribution valve disk rotate around a shaft internal to the housing, and as the turbine rotates, the gear mechanism also rotates and drives the rotation of the distribution valve disk around the shaft. The distribution valve disk includes an aperture therein. As the distribution valve disk rotates in response to the rotation of the turbine, the aperture in the disk sequentially rotates over the plurality of outlet ports, thus allowing fluid to flow through the respective outlet port.

Another aspect of the present invention includes the housing having an interior shelf with a top surface and a bottom surface. The interior shelf has a predetermined thickness in the axial direction of the housing and the interior shelf defines a plurality of openings therein. The openings provide that the inlet port may sequentially be in fluidic communication with each of the plurality of outlet ports.

Another aspect of the present invention further includes the distribution valve disk having a substantially cylindrical shape in the radial direction and a predetermined thickness in the axial direction. The aperture in the distribution valve disk can be larger than one of the openings in the interior shelf to allow the maximum fluid flow into the outlet port through the respective opening. The aperture in the disk can be of any shape and may extend from an outer edge in the circumference of the disk to an inner portion closer to the axis, or the entire aperture may be contained entirely within the interior of the disk.

Another aspect of the present invention further includes the distribution valve disk having a top surface and a bottom surface. The edges of the aperture in the top surface of the disk can have rounded edges to increase fluid flow over the edges. As the aperture in the distribution valve disk rotates over one of the plurality of openings in the interior shelf, the aperture allows fluid within the housing to flow into and through the corresponding opening and out of the corresponding outlet port and also restricts fluid from flowing out of the remaining openings. Indeed, the bottom surface of the disk is in close proximity to the upper surface of the interior shelf, such that blow-by into the remaining openings is significantly reduced, if not eliminated.

DETAILED DESCRIPTION OF PREFERRED EMBODIMENTS

Figure 1:
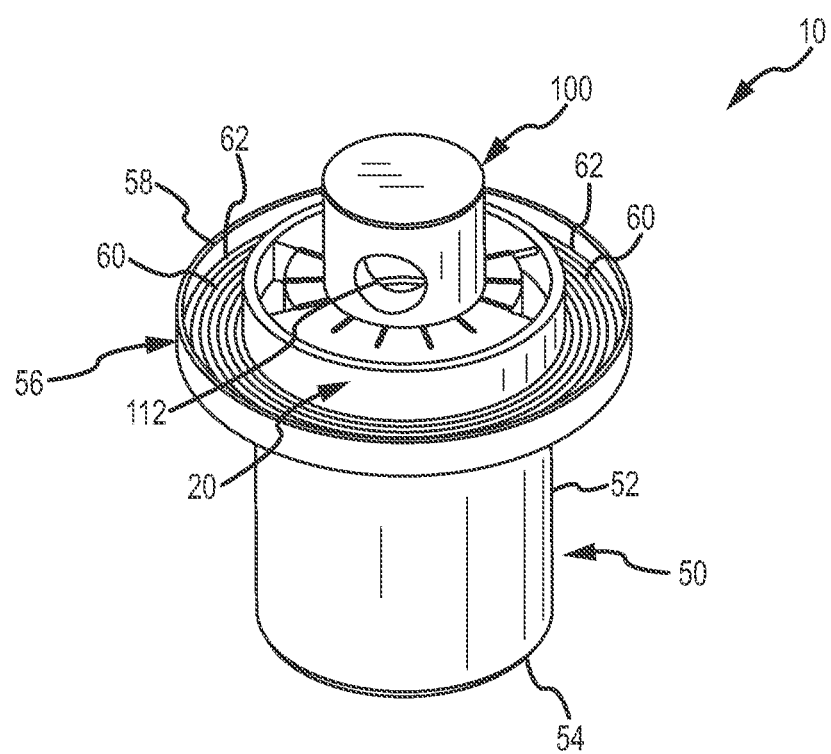
FIG. 1 is a perspective view of a cleaning head in accordance with aspects of the invention when the cleaning head is in its second position.

Turning now to the drawings, where the purpose is to describe a preferred embodiment of the invention and not limit same, FIGS. 1, 2, 3 and 3A show a cleaning head (or "head") 10 according to a preferred embodiment of the invention. Cleaning head 10 generally comprises three components: a sleeve 20, an insert 100 and a biasing element 200. Sleeve 20 and insert 100 are comprised of any suitable material, preferably plastic, and most preferably ABS with 20% barium sulfate fibers by weight. The function of the sleeve 20 is to mount into a collar 50, which is already mounted in the floor, side or steps of a pool and to retain the insert 100. Any suitable structure for this function may be used.

Figure 1A:
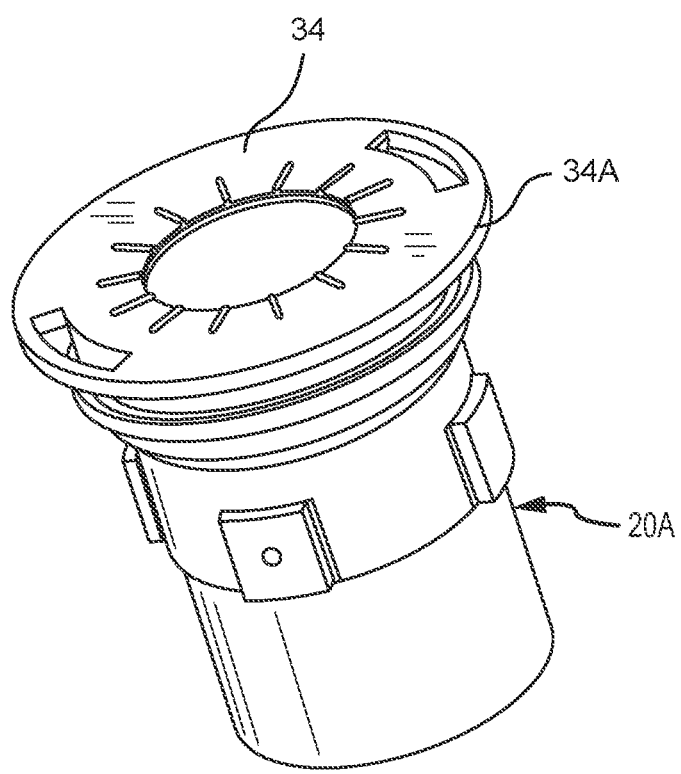
FIG. 1A is a perspective view of an alternate embodiment of the invention having a different sleeve.
Figure 1B:
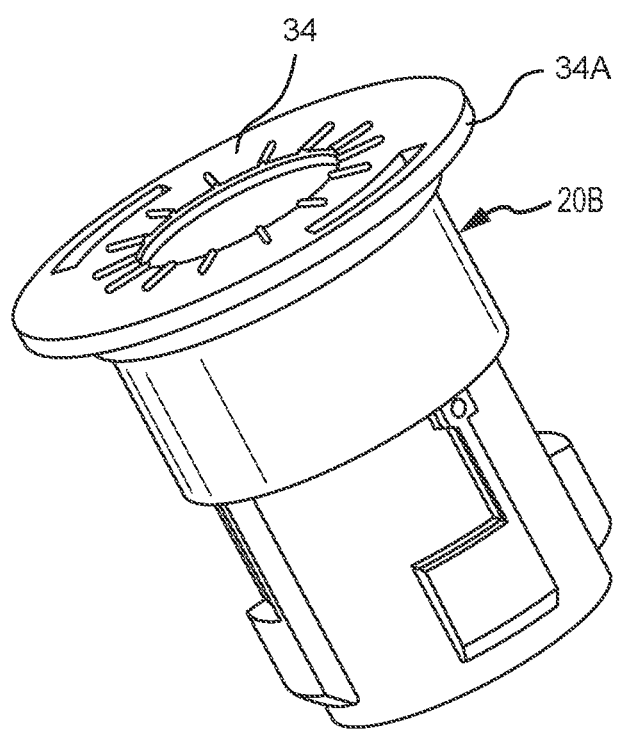
FIG. 1B is a perspective view of another alternate embodiment of the invention having a different sleeve.
Figure 1C:
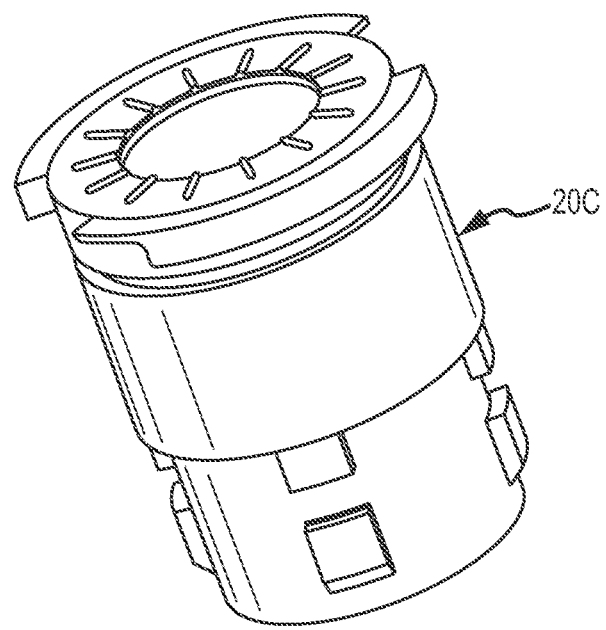
FIG. 1C is a perspective view of yet another alternate embodiment of the invention having a different sleeve.
Figure 2:
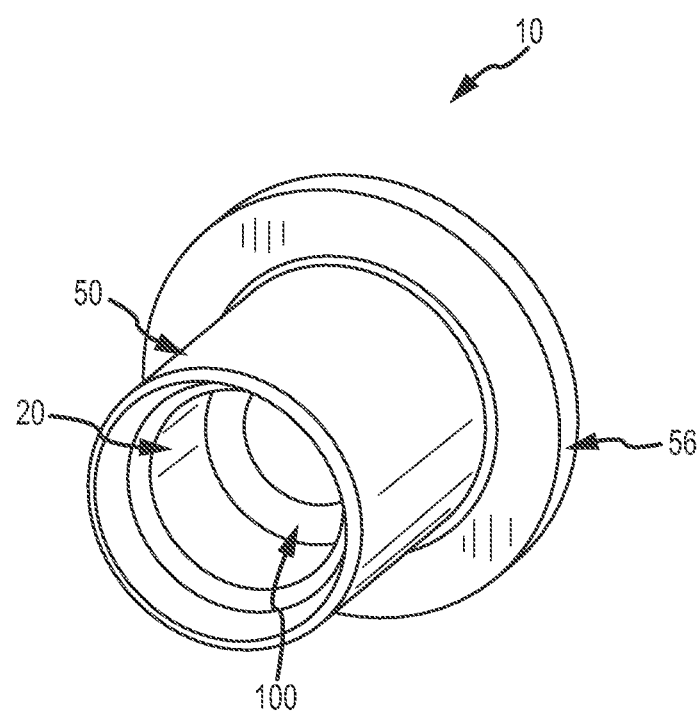
FIG. 2 is a bottom, perspective view of the cleaning head of FIG. 1.
Figure 4:
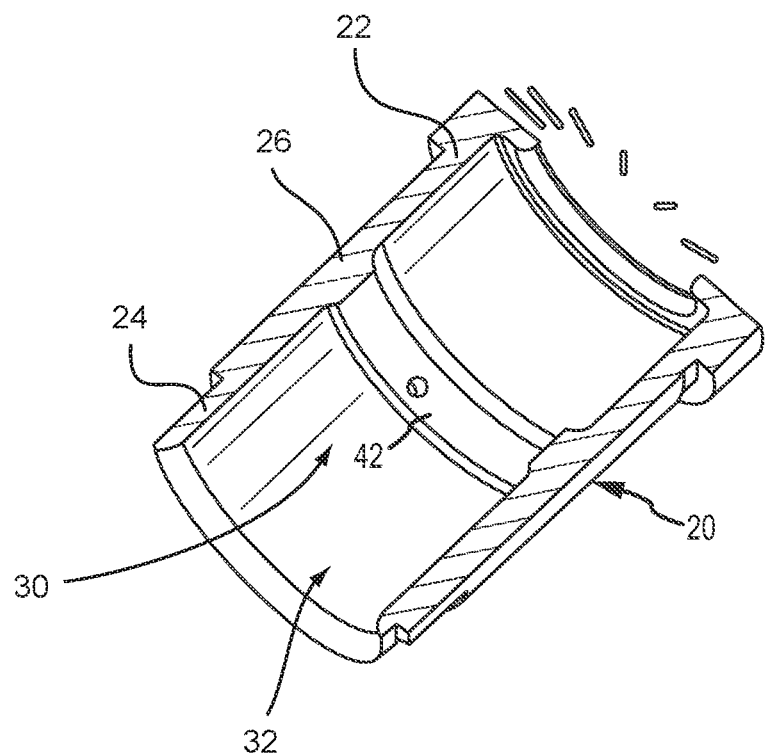
FIG. 4 is a cross-sectional view of a sleeve according to the invention.

Preferred sleeve 20 (shown in FIGS. 1-4) includes a top (or first end) 22, bottom (or second end) 24 and a generally cylindrical body 26 with an outer wall 28. A passage 30 is defined within the body 26. Bottom 24 has an opening 32. Top 22 has a circular covering 34 that covers top 22 and extends slightly beyond outer wall 28 to create a flange 34A. An opening 36, which is smaller than opening 32, is in the covering 34. As shown, the outer wall 28 includes mounting structures 38 that are known as "bayonet-style" mounting structures. These secure the sleeve into a cavity under (or behind) the surface of a pool, preferably within collar 50, and any suitable mounting structure may be used. Outer wall 28 also includes side apertures 40 for mounting pins 300, which is explained below. As shown in FIG. 4, sleeve 20 has an inner ledge 42. Different types of sleeves 20A, 20B and 20C are shown in FIGS. 1A, 1B and 1C, and each of these sleeves is configured to fit into a collar designed to receive each respective sleeve.

Collar 50 is preferably made of plastic, and preferably the same plastic as sleeve 20 and insert 100, or polycarbonate with about 30% fiberglass filler. The purpose of collar 50 is to be positioned beneath the surface of the pool and to receive sleeve 20 with insert 100 mounted therein. Preferably sleeve 20 can be removably mounted in collar 50 by a tool. Collar 50 and sleeve 20 can have any suitable structure for releasably connecting to one another and many such structures are known in the art.

The preferred collar 50 has a cylindrical body 52, a bottom edge 54 and an upper flange 56. Flange 56 extends outward from the top of collar 50 and its purpose is to be covered with concrete or other material used to make or secure the pool surface. In this embodiment, flange 56 has an outer lip 58 and grooves 60. Lip 58 and grooves 60 help to create a seal between collar 50 and the concrete or other material, and help to prevent water leaks around collar 50. As shown in this preferred embodiment, flange 56 is circular, lip 58 is higher (about twice as high) as ridges 62 that help define grooves 60.

Preferred insert 100 includes a body portion 102 that has a top (or first) body portion 104 and a bottom (or second) body portion 106. The function of insert 100 is to direct pressurized water to move debris to an area where it can be filtered from the water. As shown, the first body portion 104 is cylindrical, has a top 108, a wall 110 and an aperture 112 formed in wall 110. Second body portion 106 is generally cylindrical, is wider than first body portion 104, and has a top ledge 106A, and a wall 113 with teeth (also called grooves) 114. The purpose of teeth 114 is to help index the insert 100, as explained below. Second body portion 106 also includes a bottom 116 having an opening 118 that leads to a passage 120, which extends through the body 102 at least to aperture 112.

The bottom 116 of second body portion 106 is preferably sized to be just slightly smaller than the diameter of cavity 30 of sleeve 20. As shown, bottom 116 has a flange 116A to help reduce the space between second body portion 106 and the wall of cavity 30 while still enabling insert 100 to move freely within cavity 30. Flange 116A is positioned against inner ledge 42 when the insert 100 moves to its second position (as described below). This helps to prevent water leakage between insert 100 and sleeve 20.

First body portion 104 is configured and aligned so that it can extend through opening 32 and second body portion 106 as shown is too large to fit through opening 32. Insert 100 has a first position (shown in FIG. 1) in which it is retained within sleeve 20 and the aperture 112 does not extend beyond opening 36. Insert 100 has a second position (shown in FIG. 2) in which it extends partially beyond opening 36 and aperture 112 extends beyond opening 36.

Figure 5:
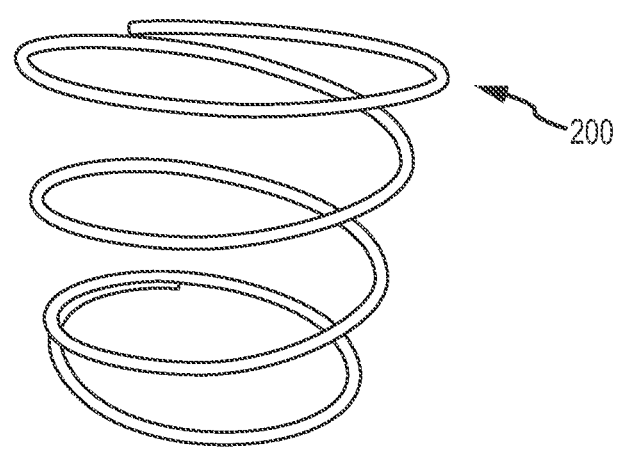
FIG. 5 is a perspective view of a biasing element according to the invention.
Figure 6:
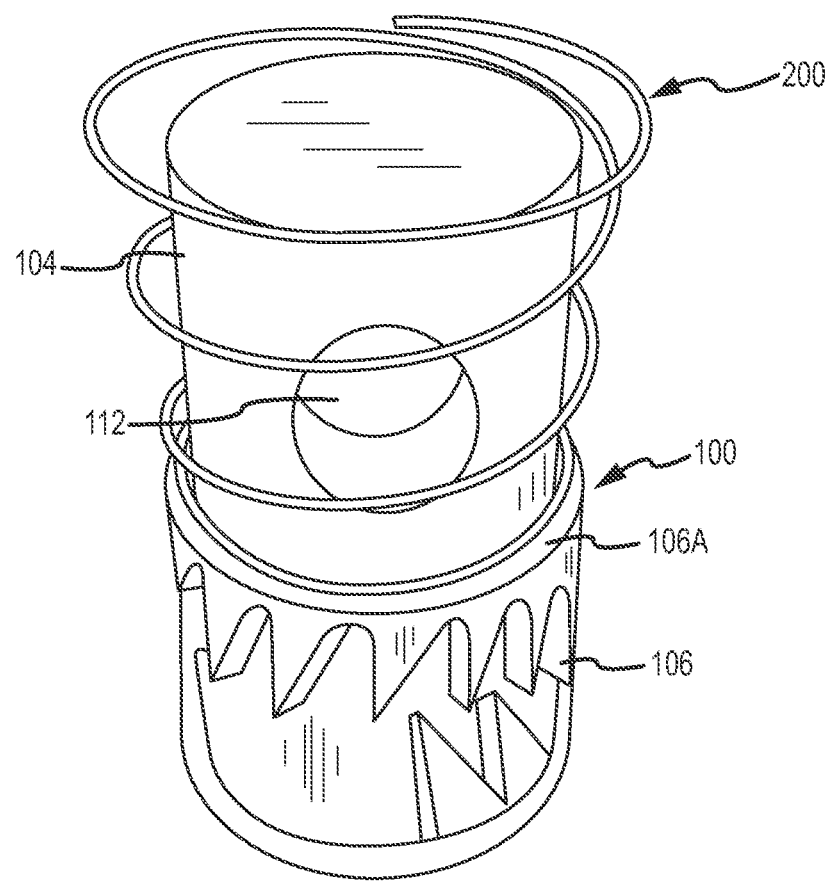
FIG. 6 is a perspective view of an insert according to the invention with the biasing element positioned thereon.

A biasing element 200 as shown in FIGS. 5 and 6 is preferably a conical spring 202 made of stainless steel. The purpose of biasing element 200 is to bias insert 100 towards its first position and any structure or device suitable for this purpose may be used. Conical spring 202 is configured to fit over first body portion 104 and rests (or is positioned) on top ledge 106A of second body portion 106. One advantage of using conical spring 202, as opposed to a standard, right cylindrical spring used in prior art heads is that the travel distance of the spring is less to create a suitable biasing force. Therefore, the insert 100 is smaller, thus requiring less material to make. Also, the collar and sleeve could be designed to be shorter, thus utilizing less material. A sleeve and insert according to the invention however, can be designed to retrofit existing collars.

Figure 3:
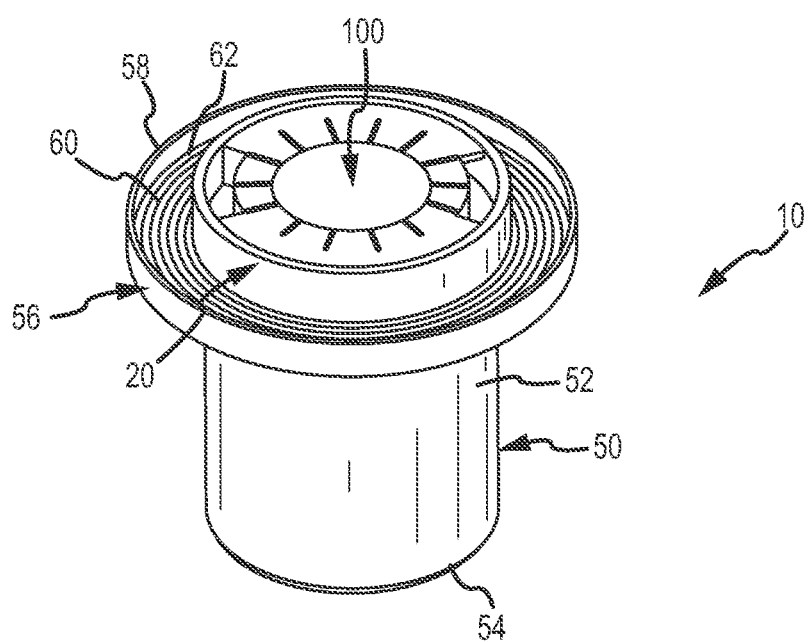
FIG. 3 is a perspective view of the cleaning head of FIG. 1 when in its first position.
Figure 3A:
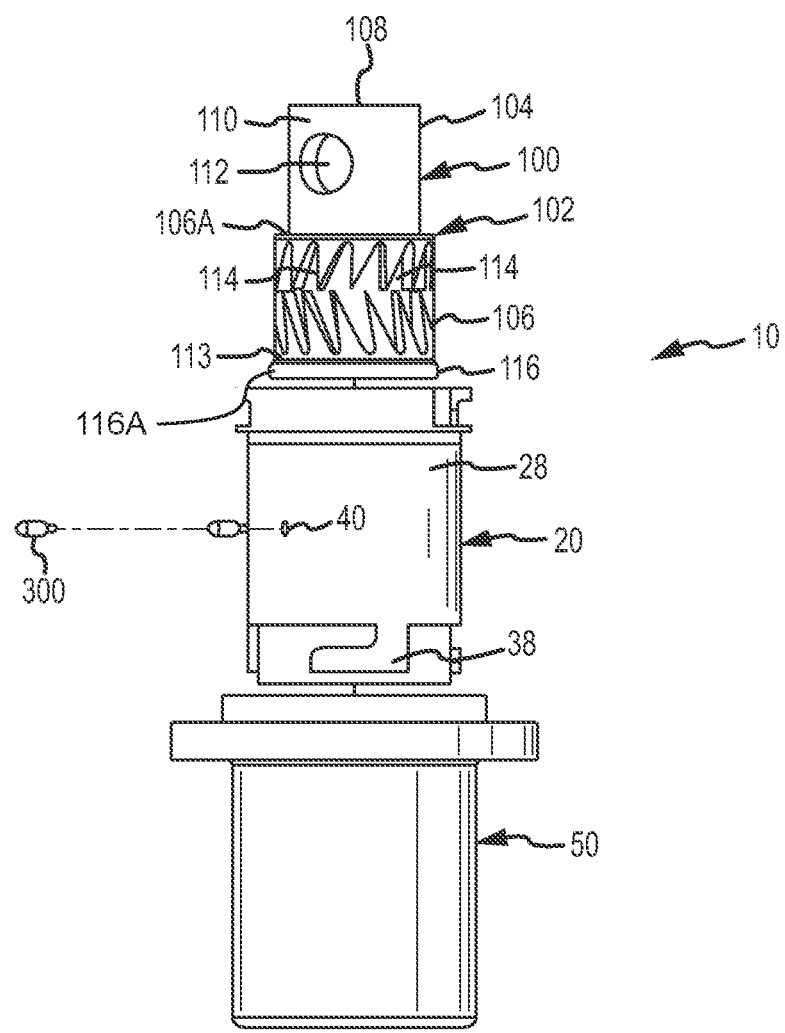
FIG. 3A is an exploded view of the cleaning head of FIG. 1 showing a sleeve, insert and biasing element.

One or more pins 300, best seen in FIG. 3A, is inserted into each of the side apertures 40. Each pin 300 engages the grooves 114 on the outer surface of the first body portion 104 as the insert 100 moves from one or more of: its first position to its second position, or its second position to its first position. In this manner, the insert 100, and hence aperture 112, sequentially rotates and the aperture 112 releases pressurized water to different locations on the pool surface as it rotates to different positions. Pin(s) 300 are preferably formed of metal, such as steel.

When pressurized water is diverted from the valve to a pipe leading to a cleaning head 10 according to the invention, the pressurized water enters the bottom of the cleaning head where it enters opening 118, enters passage 120, and the force of the pressurized water overcomes the biasing force of element 300 and moves the insert 100 from its first position to its second position in which the aperture 112 extends beyond opening 36. Pressurized water then escapes from aperture 112 and moves debris on the pool surface towards an area where it can be filtered.

Figure 7:
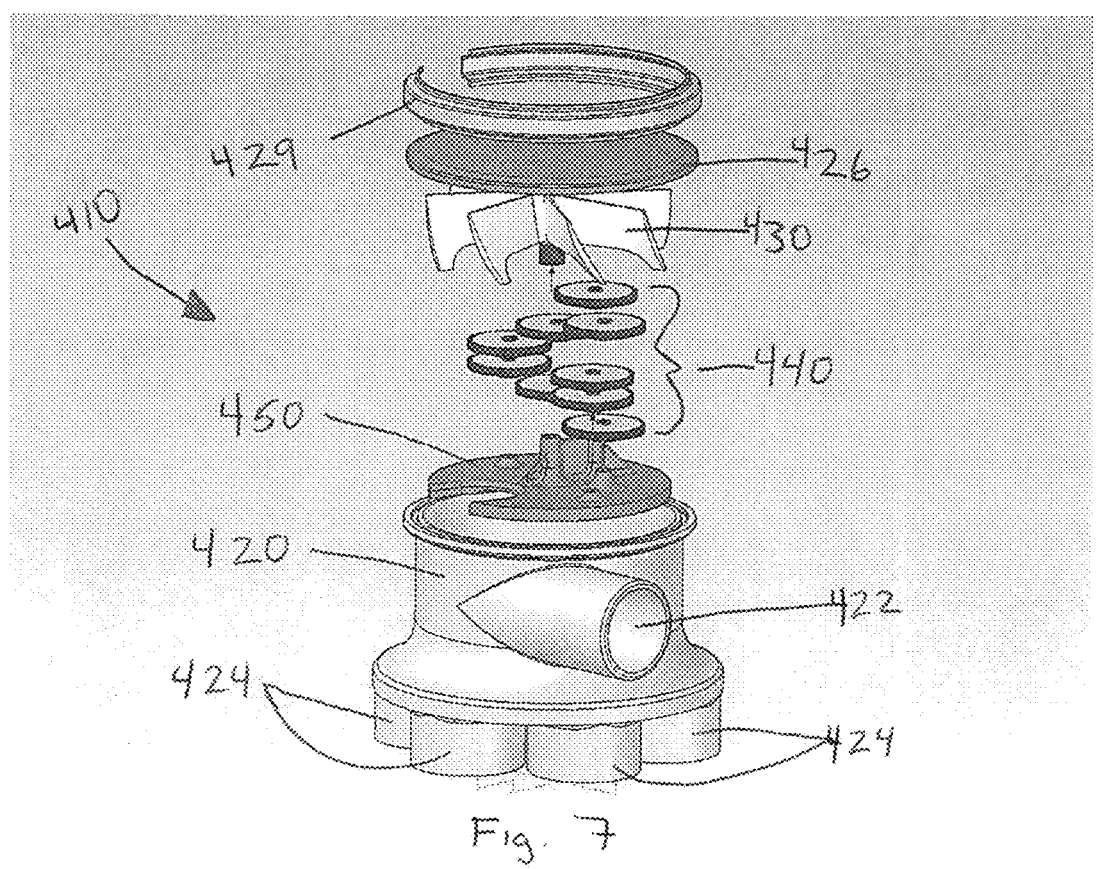
FIG. 7 is an exploded view of a distribution valve in accordance with the present invention.

As shown in FIG. 7, a distribution valve 410 comprises a housing 420, the housing 420 having an inlet port 422 and a plurality of outlet ports 424 integral thereto. The distribution valve 410 further comprises a cover 426 and a fastener 429 that removably couples the cover 426 to the housing 420. Internal to the housing 420, the distribution valve 410 further comprises a turbine 430, a gear assembly 440, and a distribution valve disk 450.

As shown in FIGS. 7-11, the inlet port 422 may be positioned in a side portion of the housing 420 and the plurality of outlet ports 424 may be positioned on a bottom portion of the housing 420. The inlet port 422 and the plurality of outlet ports 424 allow fluid from a pump (not shown) to enter the housing 420, flow through the housing 420, and exit the housing 420. A more elaborate description of the flow of fluid through the housing 420 will be provided in greater detail below.

Figure 8:
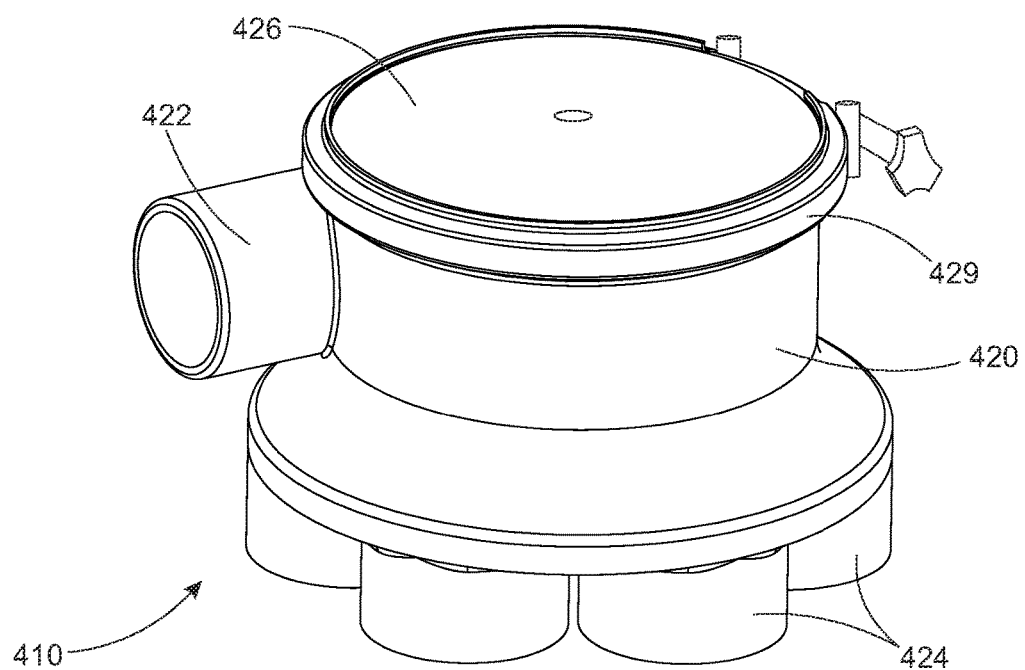
FIG. 8 is a perspective view of a distribution valve in accordance with the present invention.
Figure 9:
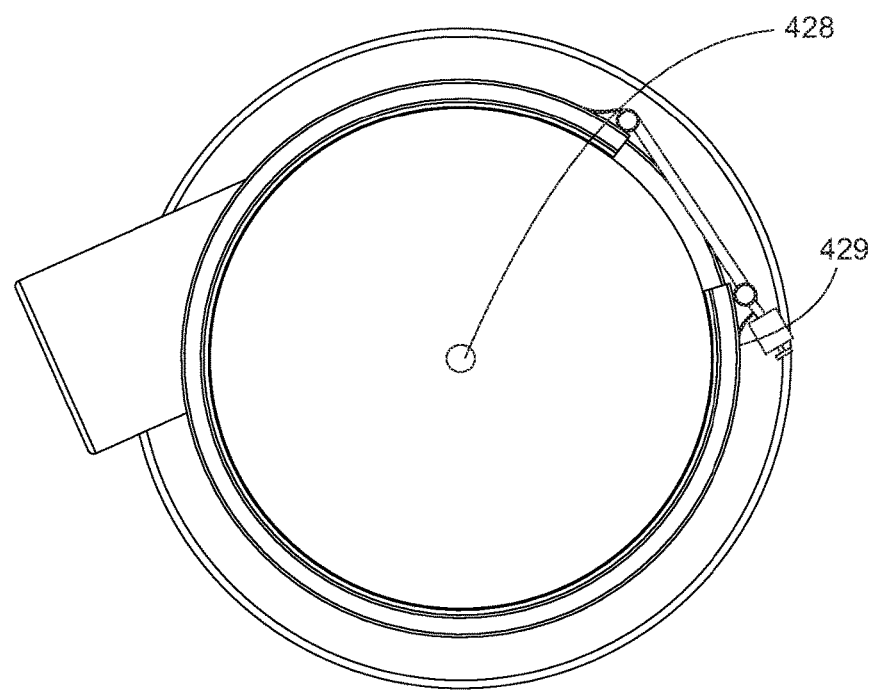
FIG. 9 is a top view of a distribution valve in accordance with the present invention.
Figure 10:
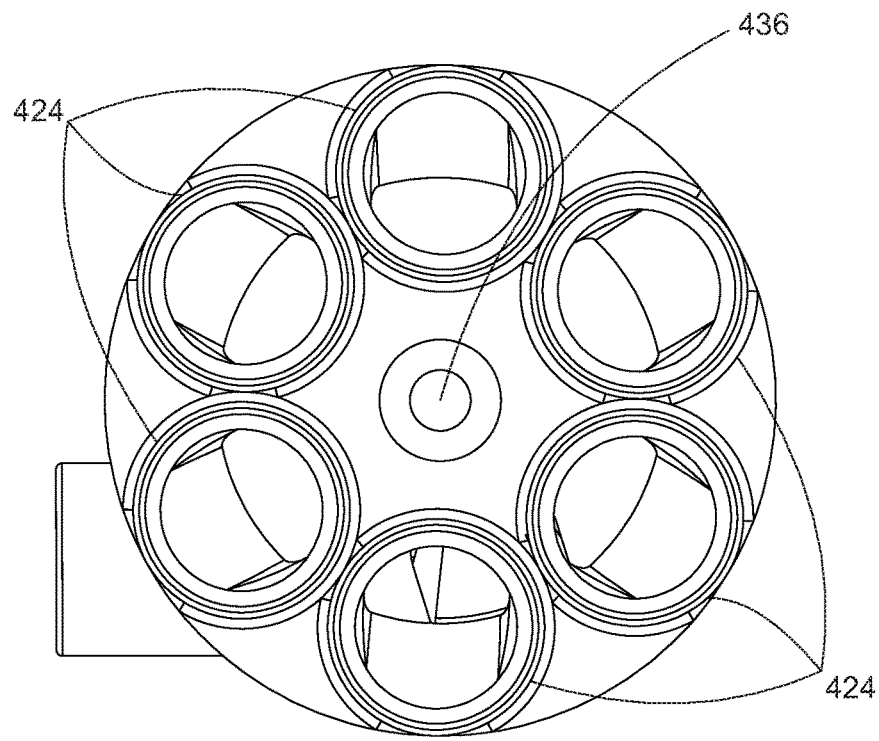
FIG. 10 is a bottom view of a distribution valve in accordance with the present invention.
Figure 11:
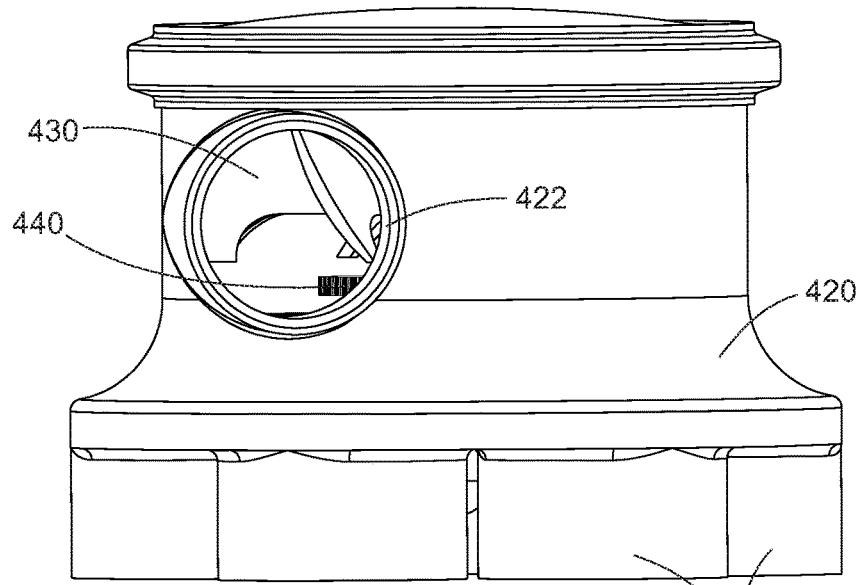
FIG. 11 is a side view of a distribution valve in accordance with the present invention.
Figure 12:
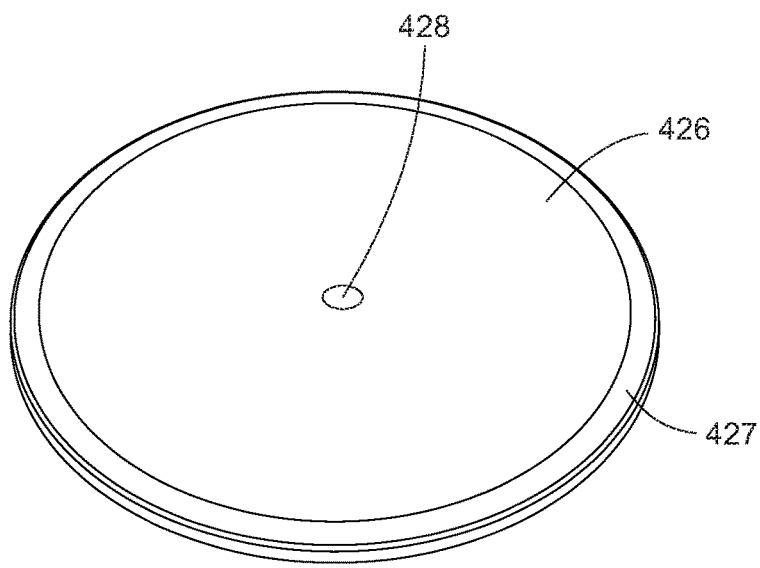
FIG. 12 is a perspective view of a lid of a distribution valve in accordance with the present invention.
Figure 13:
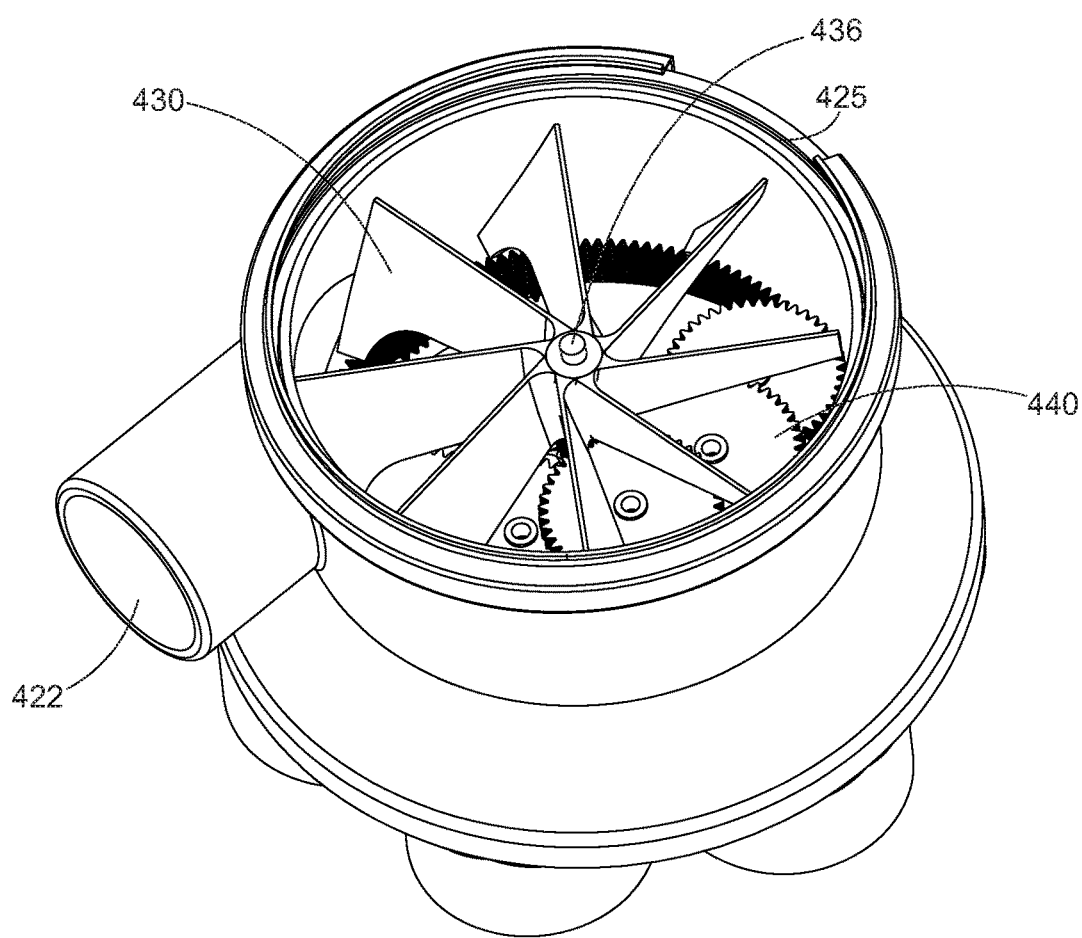
FIG. 13 is a perspective view of a distribution valve with its lid removed in accordance with the present invention.
Figure 18:
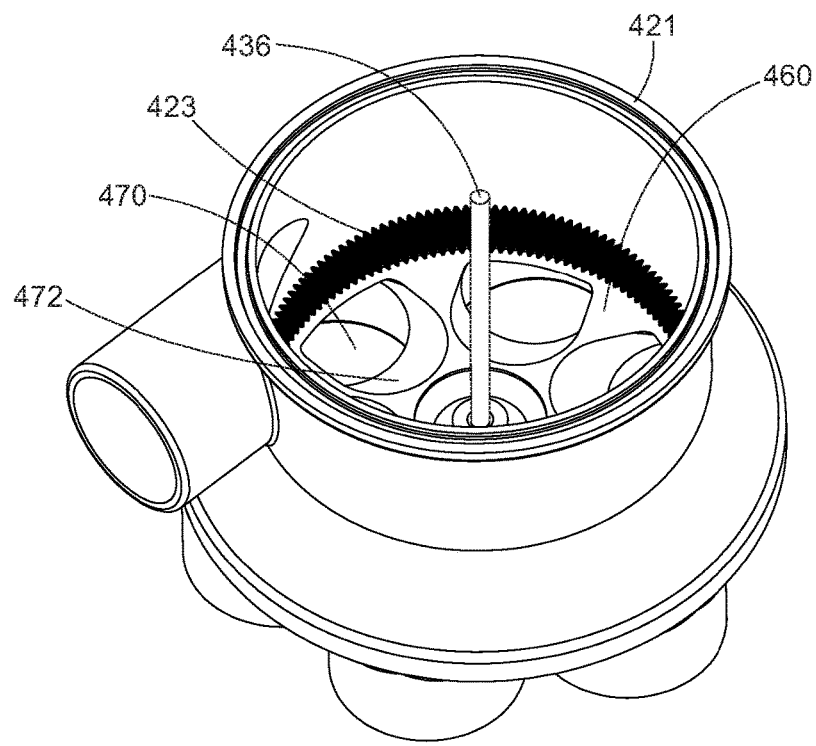
FIG. 18 is a perspective view of a housing of a distribution valve in accordance with the present invention.

As shown in FIGS. 8, 12, and 13, the cover 426 is substantially cylindrical-shaped and the outer periphery of the underside surface of the cover 426 contains a lip 427 that engages the top portion of the housing 420. The cover 426 is thus structured to create a fluidic seal between the cover 426 and the top portion of the housing 420. The fluidic seal is created upon the condition that the fastener 429 detachably couples the cover 426 to the top portion of the housing 420. With the fluidic seal in place, all the fluid that enters the housing 420 by way of the inlet port 422 exits only through the plurality of outlet ports 424. To further enhance the fluidic seal, an O-ring 425, as shown in FIG. 13, may be placed in a groove 421 in the top edge surface of the housing 420, as shown in FIG. 18, to engage the cover 426 with the housing 420.

As shown in FIG. 8, under the condition that the fastener 429 is engaged, the cover 426 is pressed against the O-ring 425 and the top portion of the housing 420. Indeed, when the cover 426 is properly coupled to the housing 420 by use of the O-ring and the fastener 428, none of the fluid that enters the distribution valve 410 exits the distribution valve 410 by way of the cover 426.

As shown in FIG. 12, the underside portion of the cover 426 also includes a receiving portion 428 in the center thereof that is structured to engage a shaft 436 in the interior of the housing 420, as shown in FIG. 13. The base portion of the shaft is coupled to an interior shelf 460 of the housing 420, to be discussed in greater detail below. When the cover 426 is coupled to the housing 420, the upper portion of the shaft 436 is securely supported by the receiving portion 428 of the cover 426.

As shown in FIG. 13, the distribution valve 410 further comprises the turbine 430 positioned within the housing 420 and near the cover 426. The turbine 430 is substantially cylindrical and rotates about the shaft 436 in response to fluid flow through the inlet port 422.

Figure 14:
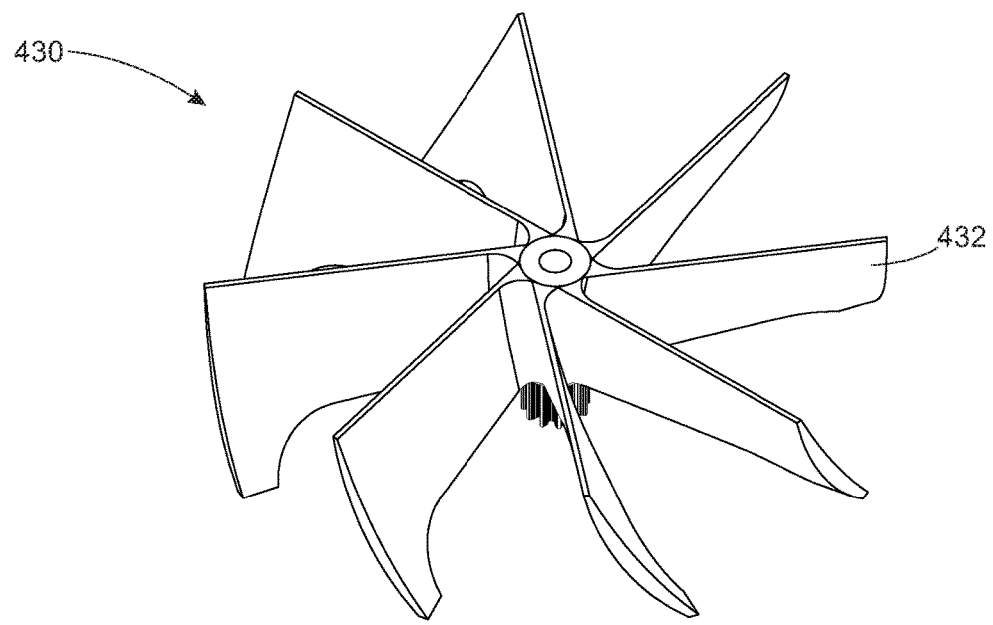
FIG. 14 is a perspective view of a turbine of a distribution valve in accordance with the present invention.
Figure 15:
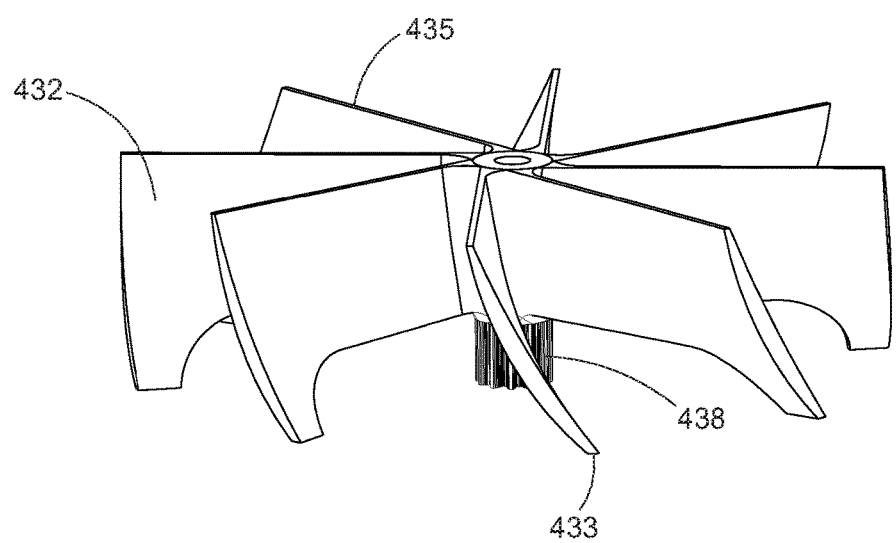
FIG. 15 is a side view of a turbine of a distribution valve in accordance with the present invention.

As shown in FIGS. 14 and 15, the turbine 430 includes blades 432 in an upper portion of the turbine 430 and a gear 438 on an underside portion thereof. The blades 432 have a thickness that gradually increases in the axial direction of the turbine 430 from the bottom of each blade 433 to the top of each blade 435. The blades 432 react to the fluid flow from the inlet port 422 and impart rotational energy to the turbine 430. The gear 438 releasably couples to the gear assembly 440. The gear assembly 440 is positioned within the housing 420 and below the turbine 430.

Figure 16:
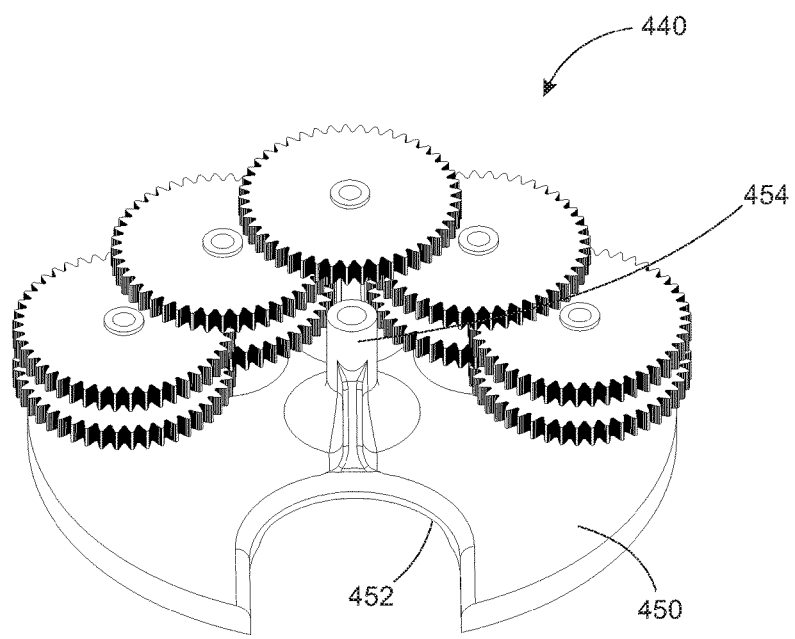
FIG. 16 is a perspective view of a gear assembly of a distribution valve in accordance with the present invention.
Figure 17:
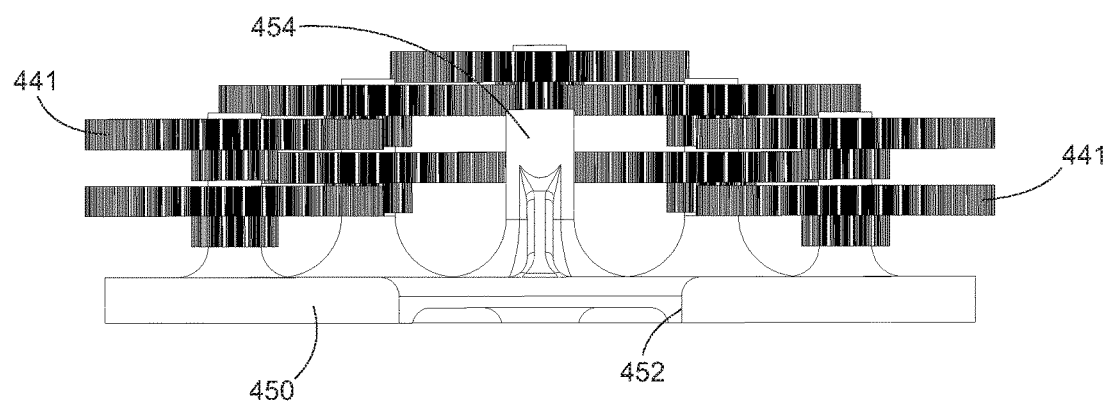
FIG. 17 is a side view of a gear assembly of a distribution valve in accordance with the present invention.
Figure 21:
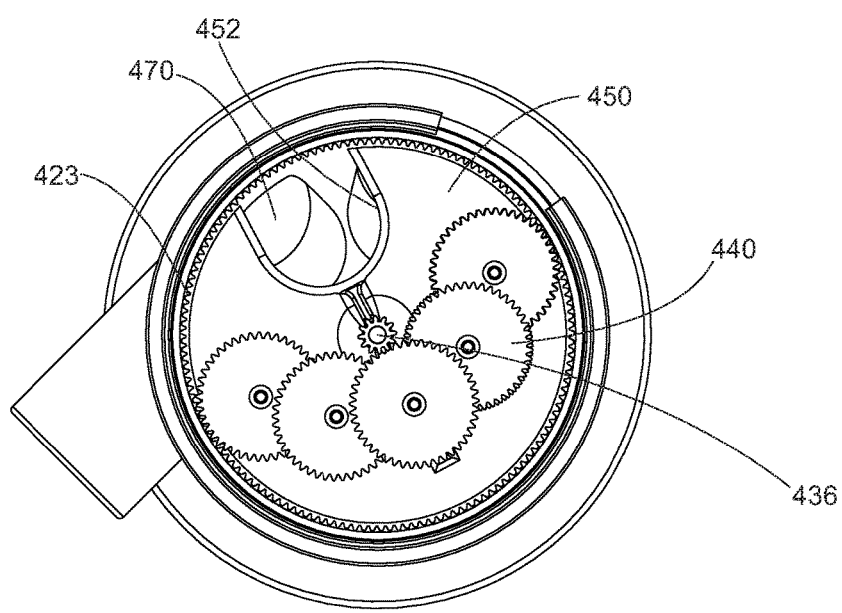
FIG. 21 is a top view of a gear assembly in a housing of a distribution valve in accordance with the present invention.

As shown in FIGS. 16 and 17, the gear assembly 440 is coupled to the distribution valve disk 450 and sits above the disk 450 within the housing 420. The gear assembly 440 is also releasably coupled to a base portion 423 of the interior wall of the housing 420, the base portion 423 being formed with cogs in its side surface to communicate with the gear assembly 440, as shown in FIG. 21. The rotational input from the turbine 430 is transferred through the gear assembly 440 to the base portion 423 of the interior wall of the housing 420. Because the interior wall 423 is integral with the housing 420 and does not rotate, the disk 450 rotates in response to the rotational input of the gear assembly 440. The structure and function of the disk 450 will be explained in greater detail below.

As shown in FIGS. 16, 17, and 21, the gear assembly 440 includes a collection of individual gears that work in tandem to provide a predetermined gear reduction ratio, such that when the gear assembly 440 receives the rotational input from the turbine 430 the gear assembly 440 reduces the rotational input of the turbine 430 by the predetermined gear ratio to provide the disk 450 with a predetermined rotational speed that is slower than the rotational speed of the turbine 430. Also, the last of the gears 441 in the collection of gears in the gear assembly 440 is structured to extend over the circumferential edge of the disk 450 so that the last of the gears 441 in the gear assembly 440 contacts the interior wall 423 without the disk 450 contacting the interior wall 423. The circumference of the disk 450 is only slightly smaller than the circumference of the interior wall 423, which allows the disk 450 to rotate within the interior wall 423 but yet substantially restrict the flow of fluid between the disk 450 and the interior wall 423.

As shown in FIGS. 16 and 17, the disk 450 is substantially cylindrical in shape and has a predetermined thickness in the axial direction. The thickness of the disk 450 is determined by the material used to manufacture the disk 450, as the disk 450 should be sufficiently strong to resist deflection in the axial direction. As the strength of the material used to make the disk 450 increases, the thickness of the disk 450 may decrease, if desired.

The disk 450 includes an aperture 452 formed in an edge surface of the disk 450 and a hollow post 454 formed on a top surface thereof. The disk 450 may be placed on the shaft 436, the shaft 436 extending through the hollow post 454, such that the disk 450 rotates about the shaft 436. Although the aperture 452 may be formed in an edge surface of the disk 450 and extend from the edge surface to a position closer to the axis of rotation, the aperture 452 may also be formed entirely within the disk 450, such that the aperture 452 does not form any part of the edge of the disk 450. The aperture 452 is generally U-shaped, but may be of any shape that allows fluid to flow easily therethrough. The upper edge of the aperture 452 may be beveled, or otherwise rounded, to allow greater fluid flow through the aperture 452. As shown in FIG. 21, the aperture 452 is generally slightly larger than any of the plurality of openings 470, to be discussed hereinafter.

Figure 22:
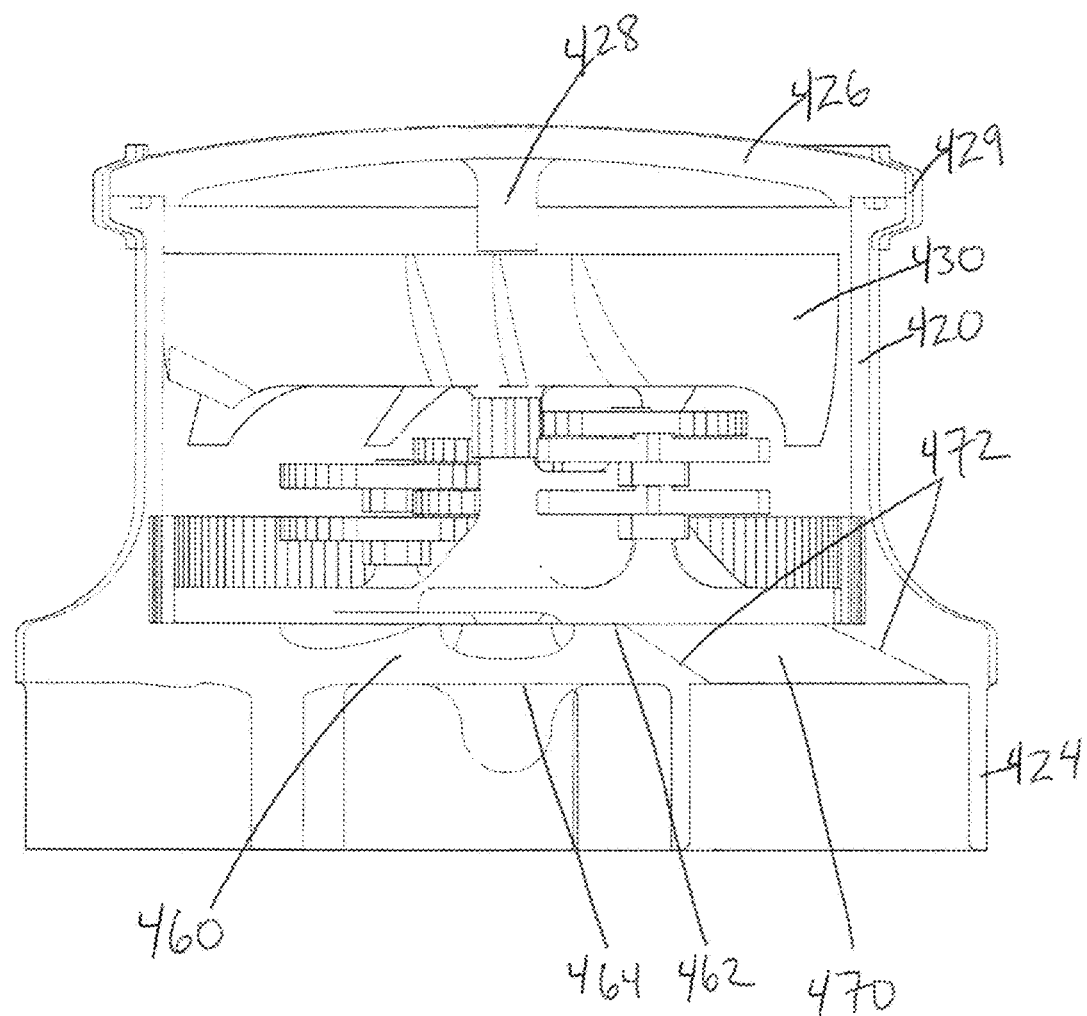
FIG. 22 is a cross-sectional view of a distribution valve in accordance with the present invention.

As shown in FIG. 22, the housing 420 further comprises an interior shelf 460 having a predetermined thickness. The interior shelf 460 is positioned between the inlet port 422 and the plurality of outlet ports 424. More specifically, the interior shelf 460 is positioned between the disk 450 and the plurality of outlet ports 424. The interior shelf 460 includes a top surface 462 and a bottom surface 464, the top surface 462 being in fluidic communication with the inlet port 422 and the bottom surface 464 being in fluidic communication with the plurality of outlet ports 424.

Figure 19:
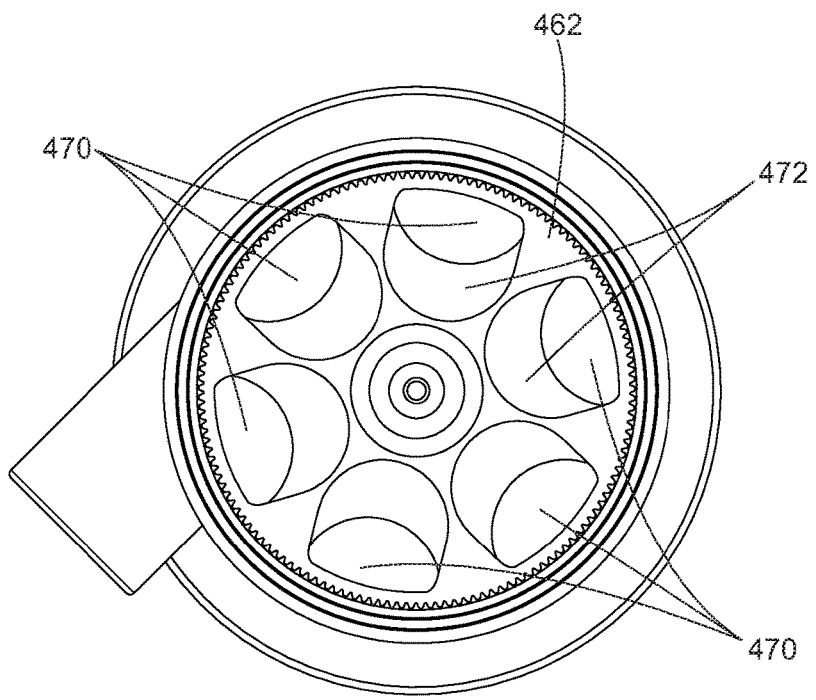
FIG. 19 is a top view of a housing of a distribution valve in accordance with the present invention.
Figure 20:
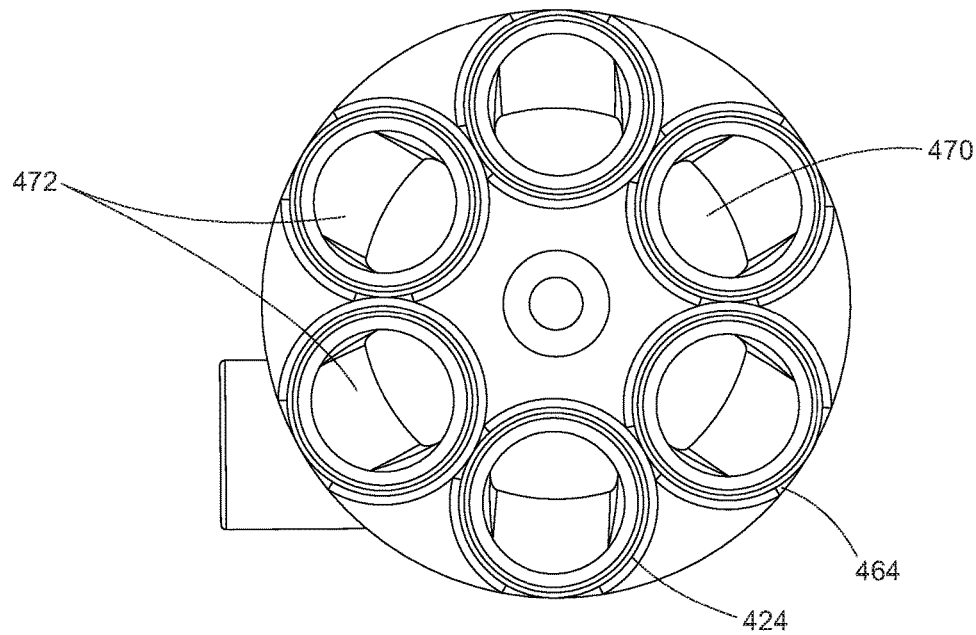
FIG. 20 is a bottom view of a housing of a distribution valve in accordance with the present invention.

As shown in FIGS. 18 and 22, the interior shelf 460 further includes a plurality of openings 470. Each of the openings 470 is substantially circular-shaped and extends from the top surface 462 of the interior shelf 460, through the interior shelf 460, to the bottom surface 464 of the interior shelf 460. Each of the openings 470 has an internal diameter similar in size to the diameter of Schedule 440 piping that those of ordinary skill in the art are familiar with. Schedule 440 piping is commonly used to connect the various components of the in-floor pool cleaning system to each other. Each of the openings 470 also has a sloped inner surface 472. Moreover, as shown in FIGS. 18 and 19, each of the openings 470 aligns with a corresponding one of the plurality of outlet ports 424, such that the inlet port 422 may be in fluidic communication with each of the plurality of outlet ports 424 through the openings 470. However, although the inlet port 422 is in fluidic communication the plurality of outlet ports 424, the flow of fluid through each of the outlet ports 424 is directly controlled by the rotational position of the disk 450 in relation to each of the openings 470.

As mentioned above, the disk 450 is positioned slightly above the top surface 462 of the interior shelf 460, but the disk 450 does not contact the interior shelf 460. In certain embodiments, the clearance between the bottom of the disk 450 and the top surface 462 is no more than ⅛ of an inch. A small clearance between the disk 450 and the interior shelf 460 is beneficial to the operation of the invention.

As the disk 450 rotates in response to the rotation of the gear assembly 440, the aperture 452 in the disk 450 rotates sequentially over each of the openings 470 in the interior shelf 460. As a result, fluid flowing into the housing 420 through the inlet port 422 is directed by the aperture 452 into one or more of the plurality of outlet ports 424 over which the aperture 452 is currently positioned. At the same time, the disk 450 and the limited clearance between the disk 450 and the openings 470 prevent most, if not all, of the fluid from flowing into any of the other outlet ports 424 over which the aperture 452 is not currently positioned. Indeed, because the clearance between the disk 450 and the openings 470 is narrow, the disk 450 substantially prevents blow-by into any of the other outlet ports 424 over which the aperture 452 is not currently positioned. Test results on the present invention indicate that only 6-7% of the water that exits the distribution valve 410 exits through an outlet port 424 over which the aperture 452 is not positioned. In comparison, test results of conventional distribution valves indicate that conventional distribution valves lose 40-45% of their water through outlet ports that are supposed to be "closed."

In addition to the above, the distribution valve 410 of the present invention provides several additional advantages over conventional devices. For example, because the aperture 452 sequentially rotates over each of the openings 470, the distribution valve 410 of the present invention eliminates the need for each of the outlet ports 424 to have its own individual valve cover to control fluid flow, as is the case in conventional devices. Moreover, because the present invention thus removes unnecessary barriers to fluid flow, the distribution valve 410 of the present invention outflows conventional devices in testing conditions by upwards of 430 gallons per minute (GPM) or 40%. Due to this increased fluid flow, the distribution valve 410 of the present invention requires less power over conventional devices and is able to operate additional cleaning heads with the same size pump as conventional devices.

The above-described advantages allow the distribution valve of the present invention to be used in conjunction with a pump and multiple groups of in-surface cleaning heads as part of an in-ground swimming pool cleaning system. By using the distribution valve of the present invention, which operates more efficiently than conventional distribution valves, as described above, any pump that pushes water through the distribution valve of the present invention requires less horsepower to push an equal amount of water to that of a pump associated with a conventional distribution valve. Thus, the in-ground cleaning systems that uses the distribution valve of the present invention may operate using a pump with less horsepower to achieve the same results as that of an in-ground swimming pool cleaning system that uses a conventional distribution valve. Therefore, any in-ground swimming pool cleaning system that utilizes the distribution valve of the present invention requires less horsepower to operate and compete equivalently in the market. Less required horsepower results in reduced costs.

Alternatively, any in-ground swimming pool cleaning system that utilizes the distribution valve of the present invention can have more in-surface cleaning heads than that of an in-ground swimming pool system that uses a similar-sized (i.e., equivalent horsepower) pump and a conventional distribution valve. This is due to the fact that a similar-sized pump can push more water through the distribution valve of the present invention than through a conventional distribution valve using the same horsepower from the pump. Thus, the in-ground swimming pool cleaning system that utilizes the distribution valve of the present invention can utilize the additional water to operate additional groups of cleaning heads without increasing the power requirement of the pump. More cleaning heads results in more effective cleaning systems, which results in cleaner pools and happier pool owners.

Having thus described embodiments of the invention, other variations and embodiments that do not depart from the spirit of the invention will become apparent to those skilled in the art. The scope of the present invention is thus not limited to any particular embodiment, but is instead set forth in the appended claims and the legal equivalents thereof. Unless expressly stated in the written description or claims, the steps of any method recited in the claims may be performed in any order capable of yielding the desired result.

What is claimed is:

1. A valve for use in an in-floor pool cleaning system, the valve comprising a housing, having an internal cavity, an inlet port, and a plurality of outlet ports; a drive source and a fluid control plate inside the cavity and connected to the drive source, the fluid control plate having an aperture that is U-shaped extending from an edge surface of the fluid control plate; whereas the drive source rotates the fluid control plate to move the aperture sequentially over each of the outlet ports in order to permit fluid to exit the outlet port over which the aperture is positioned, wherein the fluid control plate substantially prevents blow-by into any of the other outlet ports of the plurality of outlet ports over which the aperture is not currently positioned.

2. The valve of claim 1 wherein the drive source is an impeller in fluidic communication with the inlet port.

3. The valve of claim 2 wherein the impeller includes a gear.

4. The valve of claim 1 wherein the valve further includes a gear assembly having a plurality of gears, the fluid control plate being connected to the gear assembly; the gear assembly being in mechanical communication with the drive source.

5. The valve of claim 4 wherein the drive source is an impeller in fluidic communication with the inlet port, the impeller having a gear that is in mechanical communication with the gear assembly, and as fluid enters the inlet port it rotates the impeller, which in turn rotates the fluid control plate through the operation of the gear assembly; and the aperture sequentially moves over each of the outlet ports permitting fluid to enter the outlet port over which the aperture is positioned.

6. The valve of claim 5 wherein the housing has a cavity in which the gear assembly and impeller are positioned.

7. The valve of claim 4 wherein each gear of the gear assembly has the same diameter.

8. The valve of claim 4 wherein the gear assembly has fourteen gears.

9. The valve of claim 4 wherein each gear of the gear assembly has the same number of teeth.

10. The valve of claim 4 wherein the impeller includes a gear, and the gear is in mechanical communication with at least one gear of the gear assembly.

11. The valve of claim 4 wherein the gear assembly is mounted on the fluid control plate.

12. The valve of claim 11 wherein the housing has an interior floor with a shaft connected thereto, the shaft extending upwards into the cavity, and the fluid control plate, gear assembly and impeller are mounted on the shaft.

13. The valve of claim 1 wherein there are six outlet ports.

14. The valve of claim 1 wherein the fluid control plate has a single aperture.

15. The valve of claim 1 wherein the inlet port is configured to receive a pipe having a 2" I.D.

16. The valve of claim 1 wherein each outlet port is configured to receive a pipe having a 2" I.D.

17. The valve of claim 1 wherein the aperture in the fluid control plate permits fluid to flow into one outlet port at a time.

18. The valve of claim 1 wherein the fluid control plate permits fluid to flow into at least one outlet port at a time.

19. The valve of claim 1 wherein the housing further includes a removable lid.

20. The valve of claim 1 wherein the housing is plastic.

* * * * *